Jan. 2, 1968   A. W. KAMMERER, JR   3,360,840
WELL BORE MILLING APPARATUS
Filed Feb. 28, 1966   2 Sheets-Sheet 1
FIG. 1.
FIG. 2.
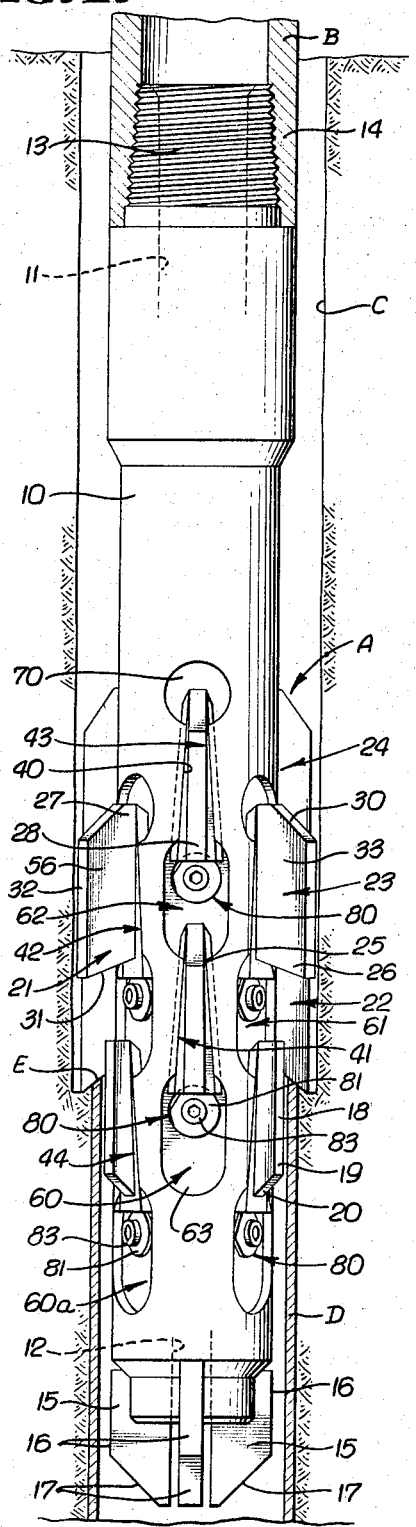
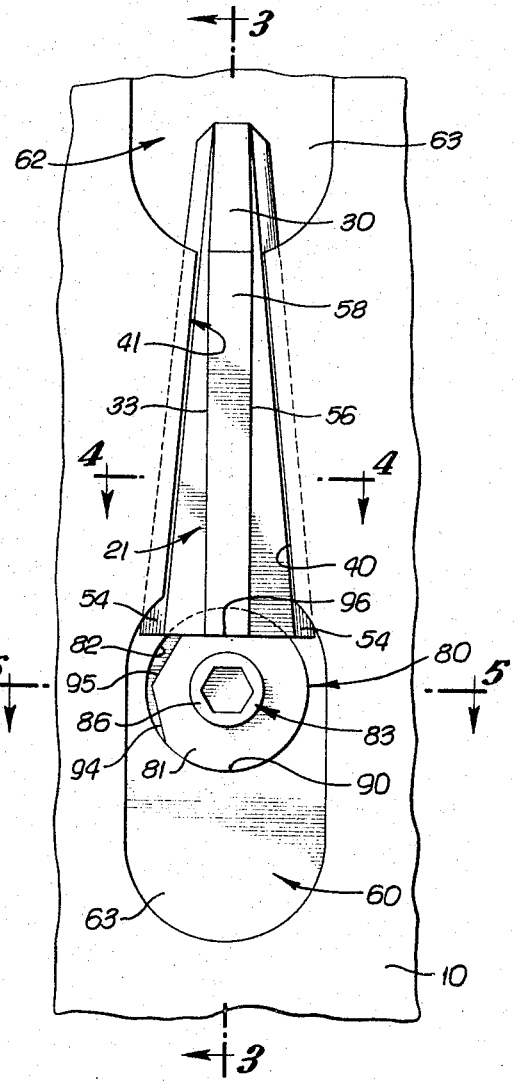
INVENTOR.
ARCHER W. KAMMERER, JR.
By Bernard Kriegel
ATTORNEY.

Jan. 2, 1968     A. W. KAMMERER, JR     3,360,840
WELL BORE MILLING APPARATUS
Filed Feb. 28, 1966                2 Sheets-Sheet 2
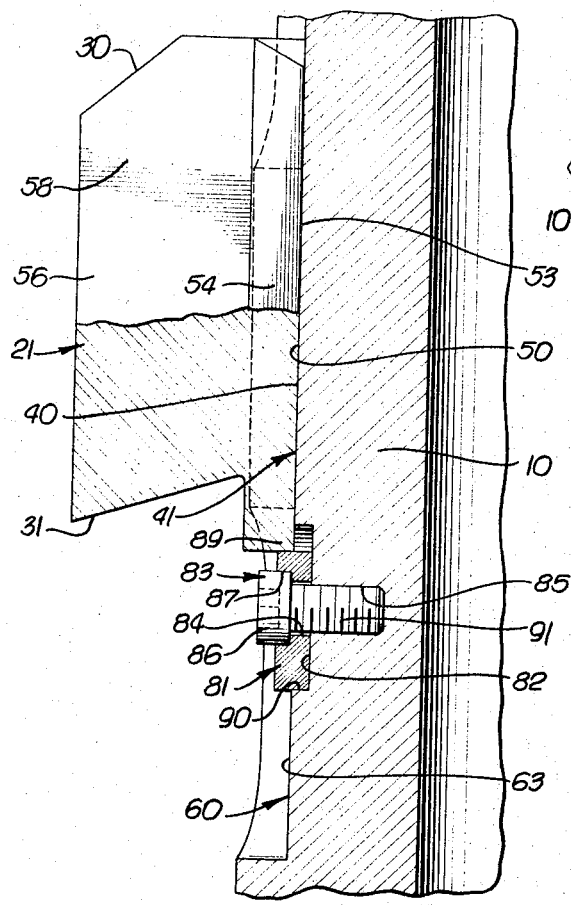
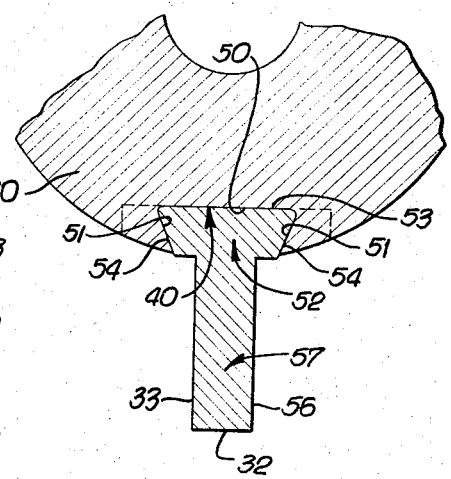
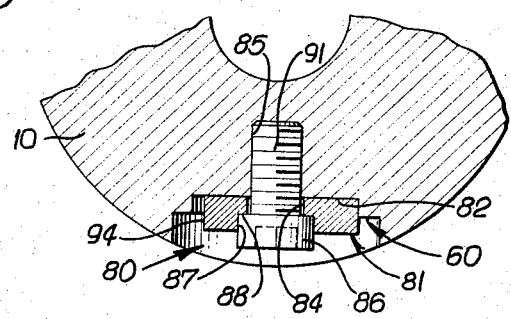
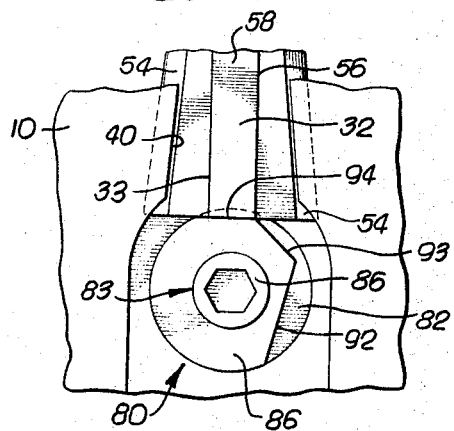
INVENTOR.
ARCHER W. KAMMERER, JR.
BY Bernard Kriegel
ATTORNEY.

United States Patent Office 3,360,840
Patented Jan. 2, 1968

3,360,840
WELL BORE MILLING APPARATUS
Archer W. Kammerer, Jr., Fullerton, Calif., assignor of one-fifth to Jean K. Lamphere and three-fifths to Archer W. Kammerer, Fullerton, Calif.
Filed Feb. 28, 1966, Ser. No. 530,501
19 Claims. (Cl. 29—105)

The present invention relates to subsurface well bore apparatus, and more particularly to apparatus for milling away tubular conduits disposed in well bores, such as liner and casing strings.

In United States Patent No. 2,855,994, a milling apparatus is disclosed and described which is capable of milling away liners, casings, and similar tubular conduits disposed in well bores. The apparatus has adjacent sets of blades in staggered relation to each other and longitudinally overlapping to prevent outward flaring of the end portion of a tubular conduit upon breaking off of the outer portions of the cutter blades or teeth. The tubular conduit gradually wears upwardly progressing grooves in the cutter blades or teeth, which eventually extend throughout substantially the entire blade length, whereupon the outer portions of the blades or teeth drop off and the inner portions tend to cause the end of the conduit to assume a tapered or outwardly flaring configuration, due to the downward wedging action of the inner portions of the cutter blades upon the tubular conduit. Such wedging load often causes the tubular conduit to split, particularly at slots or perforations therein, and, once split, milling or retrieving of the tubular conduit cannot take place.

As shown and described in the above patent, the provision of offset and overlapping cutter blades or teeth transfers the milling load to a succeeding row of blades or teeth before the grooves can be worn completely through a preceding or lower set of teeth. As a result, a proper drilling weight or load can be applied without the outward flaring or wedging of the tubular conduit and its splitting.

The present invention is directed to an improvement in the milling apparatus illustrated in Patent No. 2,855,994. It has as an objective the provision of a milling apparatus for milling away a tubular conduit disposed in a well bore, in which the cutter blades or teeth are readily replaceable.

Another purpose or objective of the invention is to provide a milling apparatus for milling away a tubular conduit disposed in a well bore, in which the replaceable cutter blades or teeth are held in the main body of the apparatus in a very simple and firm manner for most effective operation upon the tubular conduit.

Another object of the invention is to provide milling apparatus for cutting away a tubular conduit disposed in a well bore, which is centered in the tubular conduit, and in which the centering device is capable of easy retention in the main body of the apparatus and subject to ready replacement, so that a single body can be used for effective centering of the apparatus in tubular conduits of different internal diameters.

Still a further object of the invention is to provide a milling apparatus for cutting away a tubular conduit disposed in a well bore, in which the cutter blades or teeth are readily assembled in the main body of the apparatus and removed therefrom, and in which play or looseness of the cutter blades or teeth in the main body of the bit is held to a minimum in a comparatively simple and expedient manner.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view, with an associated device illustrated in longitudinal section, of a milling apparatus embodying the invention disposed in a well bore for operation upon a tubular conduit, such as a casing or a liner, disposed in the well bore;

FIG. 2 is an enlarged side elevational view disclosing one of the cutter blades or teeth mounted within the main tubular body of the milling apparatus;

FIG. 3 is a longitudinal section taken along the line 3—3 on FIG. 2;

FIG. 4 is a cross-section taken along the line 4—4 on FIG. 2;

FIG. 5 is a cross-section taken along the line 5—5 on FIG. 2;

FIG. 6 is a view corresponding to the lower portion of FIG. 2 illustrating the cutter blade or tooth and its associated holding device, the latter being disposed in a different position for the purpose of minimizing the amount of vertical play of the cutter blade or tooth in the main body of the milling apparatus.

The apparatus A disclosed in the drawings is a milling tool connectible to the lower end of a string of drill pipe B extending to the top of a well bore C, for the purpose of milling away a desired length of tubular conduit D, such as a casing or liner, disposed in the well bore. The milling apparatus includes a tubular body 10 having a central fluid passage 11 therethrough for receiving the fluid, such as drilling mud, pumped down through the drill pipe and for discharging the drilling fluid through a discharge nozzle 12 at the lower end of the tubular body into the well bore C, for the purpose of removing cuttings therefrom and flushing them upwardly around the apparatus A and the drill pipe string B to the top of the well bore. The body is secured to the drill string thereabove by threading a body pin 13 into a companion threaded box 14 in the drill pipe.

Secured to the lower portion of the tubular body are a plurality of circumferentially spaced plate-like guide members 15 welded, or otherwise suitably secured, to the lower portion of the tubular body 10. These plate members have outer longitudinal surfaces 16 which preferably project radially of the axis of the body a slightly greater distance than the outside diameter of the body itself. The lower portions 17 of the plate-like members are tapered in a downward and inward direction to effect a guiding action on the tool as it is lowered in the well bore C and into the liner D, or other tubular string, disposed therewithin.

Also mounted within the main elongate tubular body 10 of the milling apparatus are readily removable, elongate, circumferentially spaced pilot fins 18 having external longitudinal surfaces 19 parallel to the axis of the body and having a radial distance from the axis of the body conforming to and slightly less than the internal radius of the tubular member D on which the tool is to operate. These pilot fins 18 have lower portions 20 inclined or tapered in a downward and inward direction, to insure the guiding of the pilot fins into the liner D. These fins center the tubular body 10 within the liner D and they also center the cutter blades or teeth 21, described in detail hereinbelow with respect to the liner, so that they can most effectively disintegrate the latter along a desired length.

The tubular conduit D disposed in the well bore is milled away by the action of longitudinally spaced sets 22, 23, 24 of cutter blades 21 secured to the body 10 of the tool. Each set includes circumferentially spaced blades 21 of any suitable number. Adjacent sets 22, 23, 24 of blades are staggered with respect to each other and are arranged in longitudinally overlapping relation to a desired extent. The number of blades in each set can be varied, depending upon the diameter of the tubular string D being operated upon and the diameter of the tubular body 10 itself. In addition, the number of sets of blades can also be varied. Although three sets of blades are illustrated in the drawings, four, five, six, seven, or more, sets can be used, depending upon the length of casing or liner to be disintegrated by the milling action of the cutters 21 thereon.

The general arrangement of the sets 22, 23, 24 of cutter blades or teeth is the same as that illustrated in United States Patent No. 2,855,994. As disclosed, the upper portion 25 of the lower set of blades 22 is in overlapping relation to the lower portion 26 of an intermediate set of blades 23, and the upper portions 27 of the intermediate set of blades is, in turn, in overlapping relation to the lower portions 28 of the uppermost set of blades 24. Of course, if additional sets of blades were mounted on the tubular body, the upper portions of each set of blades would be in overlapping relation to the lower portions of each set of blades immediately thereabove. The upper ends 30 of the cutter blades or teeth 21 are preferably inclined in a downward and outward direction, to prevent the tool from hanging up in casing couplings (not shown), or the like, thereabove when the tool A is being elevated in the well bore for removal therefrom.

The lower ends 31 of the blades 21 of each set 22, 23, 24 may all lie in the same plane normal to the axis of the apparatus, or if the lower ends 31 are inclined in a downward and outward direction, as disclosed in FIG. 3, they all lie in the same vertical position along the tubular body 10, so that all cutter blades or teeth of each set will simultaneously engage the upper end E of the liner or tubular conduit D to be disintegrated. All of the blades are disposed radially on the body with their outer longitudinal surfaces 32 extending from the axis of the tubular body and from its periphery to the same extent. The body 10 has a diameter substantially less than the inside diameter of the tubular conduit D to be disintegrated; whereas, the longitudinal outer surfaces 32 of the cutter teeth or blades 21 have an effective diameter substantially greater than the outside diameter of the tubular conduit D, so that each cutter blade or tooth 21 extends outwardly beyond the external surface of the tubular conduit D, as well as laterally inwardly of the internal surface of the tubular conduit being operated upon. The leading faces 33 of the blades are hardfaced by depositing a suitable hardfacing material, such as sintered tungsten carbide, thereon, such hardfacing material preferably extending along the entire leading face of the blade.

Each cutter blade 21 is readily assembled on the tubular body 10 and is also readily removed therefrom. As shown, the body 10 is provided with sets 41, 42, 43 of longitudinally extending grooves 40, receiving the sets 22, 23, 24 of cutter blades or teeth 21. Each set of grooves is in staggered relation with respect to an adjacent set of grooves. In the form of apparatus specifically illustrated in the drawings, every other set of grooves may be in alignment with one another. Thus, the lower set of grooves 41 is aligned with the upper set of grooves 43; whereas, the intermediate set of grooves 42 is in staggered relation with respect thereto.

The pilot fins 18 are also removably mounted in the body 10 and are held therewithin in the same manner as the cutter blades or teeth 21. Thus, the pilot fins are mounted within circumferentially spaced, longitudinal grooves 44 that are, in the specific apparatus disclosed in the drawings, in alignment with the intermediate set of grooves 42.

Each groove 40 is of dovetail shape in cross-section, such as disclosed in FIG. 4. It includes an inner base 50 parallel to the axis of the body and inclined sides 51 that taper toward each other in a direction outwardly of the axis of the body 10. The sides 51 of the groove also incline or taper toward each other in an upward direction. The inner portion 52 of each cutter blade or tooth 21 and pilot fin 18 is also of generally dovetail shape in cross-section. Thus, each inner portion includes an inner longitudinal surface 53 and opposed sides 54 that incline toward each other in a lateral outward direction to the same extent as the sides 51 of the dovetail groove. The sides 54 of each inner portion also incline or taper toward each other in an upward direction to the same degree as the sides 51 of the dovetail groove 40. Each cutter blade 21 and pilot fin 18 extends radially outward from its inner portion 52 substantially beyond the periphery of the tubular body 10 to effect the milling action upon the liner D, or other tubular conduit (in the case of the cutter blades or teeth), and to effectively center the milling apparatus A in the liner or tubular conduit (in the case of the pilot fins). As shown, the leading and trailing sides 33, 56 of the outer portion 57 of each cutter blade and fin may be parallel to one another, or, if desired, they may be tapered as at their upper portions 58 to avoid interference with a snug and appropriate wedging fit of each cutter blade and pilot fin in its associated dovetail groove 40.

Extending downwardly from each groove 40 is a groove extension 60a, 60, 61, 62 of the body. Each groove extension has a base portion 63 in line with the base 50 of the dovetail groove 40 and has a width which is at least slightly greater than the maximum width of the base portion of the dovetail groove. The length of each groove extension 60a, 60, 61, 62 is such that a cutter blade or tooth 21, or a pilot fin 18, can be inserted in the extension below the groove 40 thereabove, and then shifted upwardly into such groove 40, until the inner portion 52 of each cutter blade or fin has its tapered sides 54 snugly engaging the tapered sides 51 of the groove, each cutter blade or fin, in effect, being wedged in its associated groove. As shown in the drawings, each blade 21 or fin 18 may extend upwardly into the lower portion of a groove extension thereabove, the uppermost set of blades 24 extending upwardly into upper groove extensions 70 provided in the tubular body above the uppermost set of longitudinally dovetail grooves 43.

In the assembly of the blades 21 and fins 18 on the bit body 10, the uppermost set of blades 24 is first inserted into the groove extensions 62 and then slipped upwardly into the uppermost set of dovetail grooves 43. The intermediate set of blades 23 is then placed in the groove extensions 61 and moved upwardly into the intermediate set of dovetail grooves 42, this intermediate set of cutter blades also projecting into upper groove extensions 70a forming a continuation of the intermediate dovetail grooves. The lower set of cutter blades or teeth 22 is then placed in the lower groove extensions 60 and shifted individually upwardly into an associated groove 41, followed by the pilot fins 18 that are placed in their lower groove extensions 60a and shifted upwardly into their associated dovetail grooves 44. Thus, all of the cutter blades and fins have been placed in upward wedging relation to the base 50 and walls 51 of their associated grooves 40. Their inadvertent dropping out of the grooves 40 is prevented by a retainer device 80 disposed in each lower groove extension 60a, 60, 61, 62.

As shown, the retainer device 80 comprises a washer 81 underlying each blade 21 and pilot fin 18 and received within a counterbore or recess 82 extending inwardly from the base 63 of each lower groove extension. Each washer is clamped against the base of the counterbore by a retaining screw 83 extending through a hole 84 in the washer and threaded into a radial bore 85 in the body 10 of the milling apparatus, a head 86 of the screw being disposed in a washer recess 87 and engaging a surface 88 of the washer. The lower end 89 of each blade or fin will engage its washer 81, which will prevent the associated blade or fin from dropping or falling out of its groove 40. If any downward force is imposed on the blade or fin, it will not be transmitted to the retaining screw 83, but through the washer 81 to the cylindrical wall 90 of the counterbore or recess 82 in which the washer is received. To assure the absence of a bending load on the screw 83, the diameter of its shank 91 is preferably made less than the diameter of the hole 84 through the washer.

The washer 81 provides a lock to prevent any substantial downward movement of each cutter blade 21 or fin 18 from its associated groove 40. Since the final wedging position of each blade or fin in its associated groove may result in a slight variation in the location of its lower end 89 in its associated lower groove extension, the washer is shaped to hold the play between it and the lower end 89 of the blade or fin to a minimum. As disclosed, the washer has a plurality of flat surfaces 92, 93, 94 formed therein normal to a radius drawn from the axis of the washer, each surface being disposed a different radial distance from the washer axis. As specifically illustrated in the drawings, there are three flat surfaces shown, the first surface 92 being closer to the washer axis than the second surface 93, and the second surface being closer to the washer axis than the third surface 94. Thus, the washer can be secured to the body by its associated screw 83 with a selected surface which will lie the closest to the lower end 89 of the cutter blade or fin when wedged upwardly in its groove 40, thereby insuring the retention of the fin or cutter blade or tooth in the body groove with a minimum amount of vertical play.

In the operation of the apparatus in milling away a tubular conduit D, the pilot fins 18 center the tool with respect to the axis of the well conduit, the lower set of blades 22 first engaging the upper end E of the liner D, or other tubular conduit. The lower set of blades will progressively mill away the tubular conduit, and in so doing, the latter will progressively form a longitudinal groove (not shown) in the set of lower cutter blades or teeth. Substantially before such blade groove can effect the breaking off of the outer portion of each blade from its inner portion, the lower ends 31 of the intermediate cutter blades 23 will have commenced operating upon the upper end E of the tubular conduit, the rotation of the tool and the imposition of the drilling weight thereon causing the tubular conduit to begin wearing grooves in the intermediate set of blades that will progressively increase in an upward direction from the lower ends of the blades. Such grooves will be formed before the outer portions of the lower set of blades would break off from their inner portions. As pointed out in Patent No. 2,855,-994, the intermediate set of blades will take part of the milling load from the lower set of blades, as well as part of the drilling weight imposed on the tubular conduit. As a result, inner portions of the lower set of blades 22 at their upper ends will be incapable of flaring or wedging the upper end of the tubular conduit in an outward direction, since such outward flaring tendency is prevented by the grooves worn in the intermediate set of blades 23.

The same action will occur with respect to the intermediate set of blades or teeth 23 and the upper set of blades or teeth 24. Before the intermediate set is worn through by the conduit, the upper set of blades or teeth will commence performing their milling action on the conduit D, with centering grooves formed in such blades 24.

During the imposition of drilling weight on the cutter blades, they are forced in a relative upward direction in the dovetail grooves 40, and will be held in wedged relation to the base 50 and sides 51 of the grooves. The wedged relation is tight, and there will be no looseness between the blades and the tubular body 10, the blades, in effect, functioning as if they were integrated to the tubular body itself.

In the event that all milling cutters are worn through and an additional length of liner D is to be milled away, the tool A is removed from the well bore. It is a simple matter to remove the cutter blades 21 simply by removing the screws 83 and the washers 81, and driving the cutter blades downwardly from the grooves 40, whereupon a new set of cutter blades can be assembled on the body in their place and retained in the grooves by the washers and screws. If necessary, the pilot fins 18 can also be replaced to insure the proper centering of the apparatus in the liner or other tubular conduit. Since the cutting blades or teeth 21 and the pilot fins 18 are replaceable in the field, material economies are effected, since it is unnecessary to have a complete replacement milling tool available at the well location. It is only necessary to supply additional cutters and pilot fins.

The fact that the milling load is transferred to succeeding rows or sets of cutter blades or teeth, before the grooves completely sever a preceding row of blades or teeth, prevents a wedging action, due to the drilling weight, from flaring the liner, or other tubular conduit, outwardly, and possibly effecting its splitting. Thus, the optimum milling or drilling weight can be applied without fear of flaring, splitting, or otherwise damaging the liner, or other tubular conduit.

I claim:

1. In apparatus for performing a drilling operation in a well bore: a tubular body adapted to be rotated by a drill string and having a longitudinal groove opening through its periphery, the side walls of said groove being inclined toward each other in a direction laterally outwardly of the axis of said body; and a cutter blade in said groove extending laterally outwardly of said body and having a transverse cutting edge, said cutter blade having a portion in said groove provided with sides inclined toward each other in a direction laterally outwardly of the axis of said body and conforming to and engaging the sides of said groove.

2. In apparatus as defined in claim 1; said side walls of said groove also being inclined toward each other in a direction longitudinally of said body, and said cutter blade sides also being inclined toward each other in said same longitudinal direction.

3. In apparatus as defined in claim 1; said transverse cutting edge being at substantially the lower end of said cutter blade; said side walls of said groove also being inclined toward each other in an upward direction, and said cutter blade sides also being inclined toward each other in an upward direction.

4. In apparatus as defined in claim 1; said body having a longitudinal groove extension opening through its periphery and communicating with an end of said longitudinal groove, said groove extension being of a length and width to receive said cutter blade for lengthwise movement of said blade from said groove extension into said groove to place the sides of said blade into contact with the sides of said groove.

5. In apparatus as defined in claim 1; said side walls of said groove also being inclined toward each other in a direction longitudinally of said body, and said cutter blade sides also being inclined toward each other in said same longitudinal direction; said body having a longitudinal groove extension opening through its periphery and communicating with the wider end of said longitudinal groove; said groove extension being of a length and width to receive said cutter blade for lengthwise movement of said blade from said groove extension into said groove to place the sides of said blade into contact with the sides of said groove.

6. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; said body having a longitudinal groove extension opening through its periphery below and communicating with said longitudinal groove, said groove extension being of a length and width to receive said cutter blade for upward movement of said blade from said groove extension into said groove to place the sides of said blade into contact with the sides of said groove.

7. In apparatus as defined in claim 1; and retaining means secured to said body and engageable with said blade to prevent endwise removal of said blade from said groove.

8. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; and retaining means secured to said body and engageable with the lower end of said blade to prevent substantial downward movement of said blade in said groove.

9. In apparatus as defined in claim 1; said body having a longitudinal groove extension opening through its periphery and communicating with an end of said longitudinal groove, said groove extension being of a length and width to receive said cutter blade for lengthwise movement of said blade from said groove extension into said groove to place the sides of said blade into contact with the sides of said groove; and retaining means in said groove extension secured to said body and engageable with said blade to prevent endwise removal of said blade from said groove.

10. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; said body having a longitudinal groove extension opening through its periphery below and communicating with said longitudinal groove, said groove extension being of a length and width to receive said cutter blade for upward movement of said blade from said groove extension into said groove to place the sides of said blade into contact with the sides of said groove; and retaining means in said groove extension secured to said body and engageable with said blade to prevent downward removal of said blade from said groove.

11. In apparatus as defined in claim 1; and retaining means secured to said body and engageable with said blade to prevent endwise removal of said blade from said groove; said retaining means including a washer adapted to contact said blade and a screw securing said washer to said body, said body having a recess receiving said washer, whereby endwise force imposed on said blade is transmitted through said washer to the wall of said recess.

12. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; and retaining means secured to said body and engageable with the lower end of said blade to prevent substantial downward movement of said blade in said groove; said retaining means including a washer adapted to contact said blade and a screw securing said washer to said body, said body having a recess receiving said washer, whereby endwise force imposed on said blade is transmitted through said washer to the wall of said recess.

13. In apparatus as defined in claim 1; said body having a longitudinal groove extension opening through its periphery and communicating with an end of said longitudinal groove, said groove extension being of a length and width to receive said cutter blade for lengthwise movement of said blade from said groove extension into said groove to place the sides of said blade into contact with the sides of said groove; and retaining means in said groove extension secured to said body and engageable with said blade to prevent endwise removal of said blade from said groove; said retaining means including a washer adapted to contact said blade and a screw securing said washer to said body, said body having a recess receiving said washer to precent endwise removal of said blade is transmitted through said washer to the wall of said recess.

14. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; said body having a longitudinal groove extension opening through its periphery below and communicating with said longitudinal groove, said groove extension being of a length and width to receive said cutter blade for upward movement of said blade from said groove extension into said groove to place the sides of said blade into contact with the sides of said groove; and retaining means in said groove extension secured to said body and engageable with said blade to prevent downward removal of said blade from said groove; said retaining means including a washer adapted to contact the lower end of said blade and a screw securing said washer to said body, said body having a recess receiving said washer, whereby downward force imposed on said blade is transmitted through said washer to the wall of said recess.

15. In apparatus as defined in claim 1; and retaining means secured to said body and engageable with said blade to prevent endwise removal of said blade from said groove; said retaining means including a washer adapted to engage said blade and a screw securing said washer to said body, said washer having a plurality of flat portions disposed at different distances from the washer axis for selective engagement with said blade.

16. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; said body having a longitudinal groove extension opening through its periphery below and communicating with said longitudinal groove, said groove extension being of a length and width to receive said cutter blade for upward movement of said blade from said groove extension into said groove to place the sides of said blade into contact with the sides of said groove; and retaining means in said groove extension secured to said body and engageable with said blade to prevent downward removal of said blade from said groove; said retaining means including a washer adapted to engage the lower end of said blade and a screw securing said washer to said body, said body having a recess receiving said washer, whereby downward force imposed on said blade is transmitted through said washer to the wall of said recess, said washer having a pluarlity of flat portions disposed at different distances from the washer axis for selective engagement with the lower end of said blade.

17. In apparatus as defined in claim 1; said body having sets of circumferentially spaced grooves disposed along the length of said body, said grooves having said inclined side walls, sets of cutter blades having said inclined sides in said grooves; adjacent sets of grooves and blades being circumferentially offset with respect to each other.

18. In apparatus as defined in claim 1; said transverse cutting edge being at substantially the lower end of said cutter blade; said side walls of said groove also being inclined toward each other in an upward direction, and said cutter blade sides also being inclined toward each other in an upward direction; said body having a longitudinal groove extension opening through its periphery below and communicating with said longitudinal groove, said groove extension being of a length and width to receive said cutter blade for upward movement of said blade from said groove extension into said groove to place the sides of said blade into contact with the sides of said groove; said body having sets of circumferentially spaced longitudinal grooves disposed along the length of said body and having said inclined side walls, said body also having sets of said groove extensions communicating with said longitudinal grooves, sets of cutter blades having said inclined sides in said grooves; adjacent sets of grooves, groove extensions and blades being circumferentially offset with respect to each other.

19. In apparatus as defined in claim 1; said transverse cutting edge being at substantially the lower end of said cutter blade; said side walls of said groove also being inclined toward each other in an upward direction, said cutter blade sides also being inclined toward each other in an upward direction; said body having a longitudinal groove extension opening through its periphery below and communicating with said longitudinal groove, said groove extension being of a length and width to receive said cutter blade for upward movement of said blade from said groove extension into said groove to place the sides of said blade into contact with the sides of said groove; said body having sets of circumferentially spaced longitudinal grooves disposed along the length of said body and having said inclined side walls, said body also having sets of said groove extensions communicating with said longitudinal grooves, sets of cutter blades having said inclined sides in said grooves; adjacent sets of grooves, groove extensions and blades being circumferentially offset with respect to each other; and retaining means secured to said body and engageable with each of said blades to prevent endwise removal of said blades from said grooves, each of said retaining means including a washer having a plurality of flat portions disposed at different distances from the washer axis for selective engagement with said blade, a screw securing each of said washers to said body, said body having recesses receiving said washers, whereby endwise force imposed on said blades is transmitted through said washers to the walls of said recesses.

No references cited.

HARRISON L. HINSON, *Primary Examiner*.